United States Patent

Della Torre

[15] 3,705,394

[45] Dec. 5, 1972

[54] OSCILLATING TRANSVERSE FIELD BUBBLE DOMAIN PROPAGATION

[72] Inventor: Edward Della Torre, Toronto 165, Ontario, Canada

[73] Assignee: Canadian Patents and Development Ltd., Ottawa, Ontario, Canada

[22] Filed: Oct. 4, 1971

[21] Appl. No.: 186,199

[52] U.S. Cl. ........................340/174 TF, 340/174 SR
[51] Int. Cl..........................G11c 19/00, G11c 11/14
[58] Field of Search ....................340/174 TF, 174 SR

[56] References Cited

UNITED STATES PATENTS 3,541,535 11/1970 Perneski.........................340/174 TF

*Primary Examiner*—James W. Moffitt
*Attorney*—James R. Hughes

[57] ABSTRACT

A bubble domain propagation circuit made up of an overlay pattern of bars of different shapes such that their differing demagnetizing fields make them vary in the magnetic field strength required to reverse their magnetic polarities. The preferred arrangement comprises a series of bars formed of films of material having magnetic proportions e.g. permalloy overlying the film containing the bubbles. The arrangement is made up of long and short bars with the bubbles moving from the vicinity of one bar to the next on application of a suitably shaped varying transverse field. In the simplest arrangement the bars are alternately long and short and the transverse field is a sine wave.

3 Claims, 2 Drawing Figures

OSCILLATING TRANSVERSE FIELD BUBBLE DOMAIN PROPAGATION

Figures 1, 2:
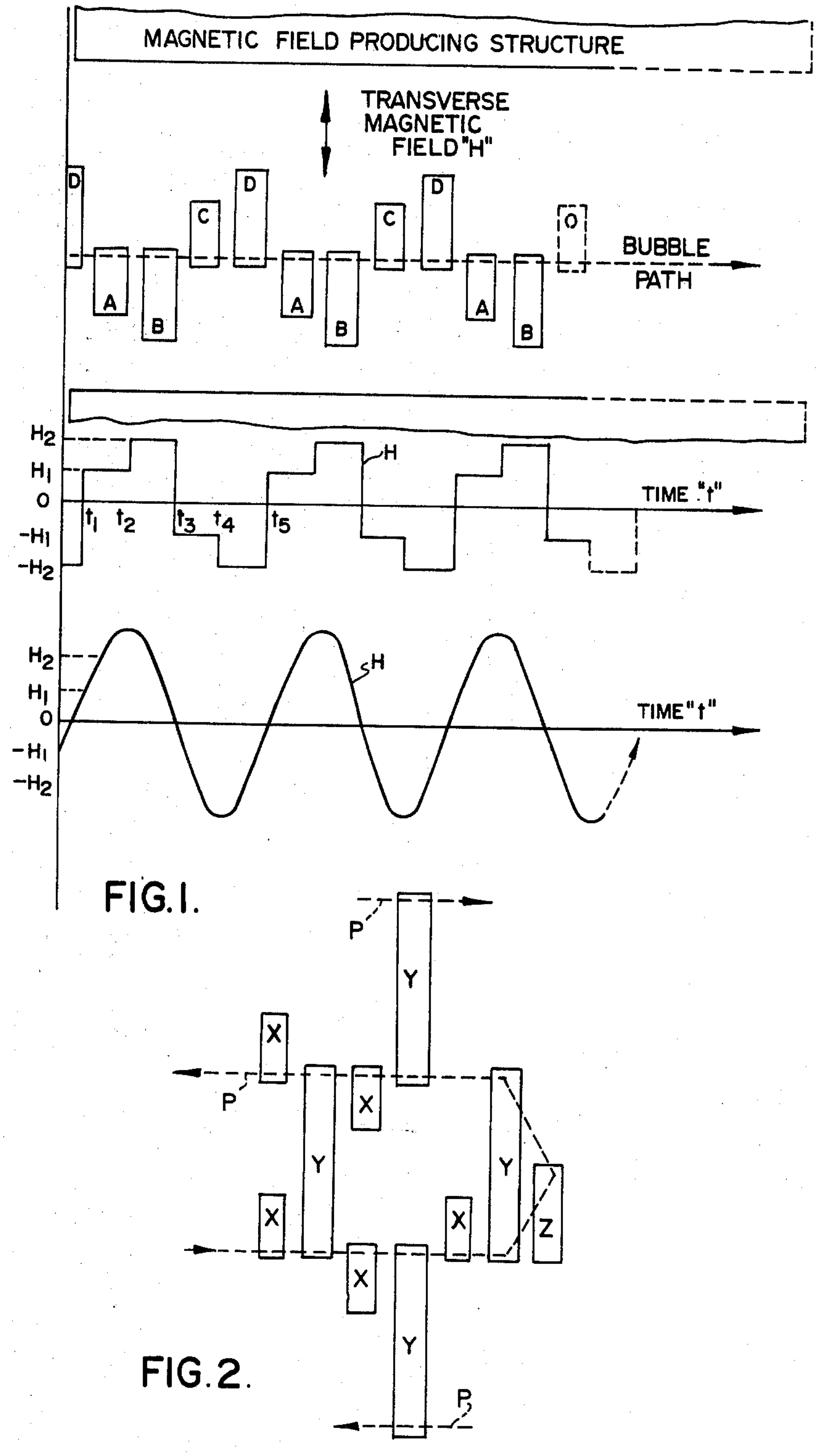

This invention relates to magnetic bubble domain propagation and more particularly to a method of moving such bubbles using an oscillating transverse magnetic field.

The use of magnetic domains or bubbles moving in thin films of magnetic materials such as rare earth orthoferrite or garnet promises to have an important future in data handling and storage. These techniques would provide a new kind of computer memory that would be less expensive, have a longer life, and would obviate some of the difficulties in present memory devices such as ferrite cores and magnetic disc and tape memories. For further information on this new technology the reader is referred to the article "Magnetic Bubbles" by A. H. Bobeck and H. G. D. Scovil in Scientific American, June 1971.

One of the problems involved in using magnetic bubbles in the movement of these bubbles along a path or row in a precise controlled manner. There are known methods to accomplish this with the most important being to place Permalloy overlays over the magnetic material. A transverse magnetic field is used to induce magnetic poles in the overlay to attract the bubbles. The transverse field is then rotated by electronic means which causes the position of the poles to move in a unidirectional fashion. This method has certain drawbacks in that to obtain a rotating transverse field it is necessary to have two pairs of magnetizing coils and the currents applied to the coils have to be maintained 90° out of phase. Also it is not possible to have both linear motion as in the "T bar" overlay, and well defined poles as in the "Y bar" overlay. Both of these factors slow down the ultimate response of the device.

It is an object of the present invention to provide a method and means for moving bubble domains in a thin film using only unidirectional magnetic fields.

It is another object of the invention to provide a method and means for moving bubble domains that has fast response.

It is another object of the invention to provide a method and means for moving bubble domains that provides high information density.

These and other objects of the invention are achieved by a bubble domain propagation circuit made up of an overlay pattern of bars of different shapes such that their differing demagnetizing fields make them vary in the magnetic field strength required to reverse their magnetic polarities. The preferred arrangement comprises a series of bars formed of films of material having magnetic proportions e.g. permalloy overlying the film containing the bubbles. The arrangement is made up of long and short bars with the bubbles moving from the vicinity of of one bar to the next on application of a suitably shaped varying transverse field. In the simplest arrangement the bars are alternately long and short and the transverse field is a sine wave.

In drawings which illustrate embodiments of the invention,

FIG. 1 shows a bubble path arrangement of long and short bars with forms of magnetizing fields that may be used to cause movement of the bubbles, and FIG. 2 is an arrangement that would allow close packing with the bubbles moving in parallel paths.

Referring to FIG. 1 a series of short bars A and C and relatively longer bars B and D are positioned alternately as shown. The bars are made up of magnetic material preferably permalloy and take the form of an overlay over a film of material that will engender and propagate the bubble domains e.g. rare earth orthoferrite or garnet. The lengths of the bars are chosen to afford different switching fields with bars A and C easier to magnetize than bars B and D. The difference in magnetizability is accomplished by using different shapes for the bars and the most suitable way of doing this is by having bars A and C shorter than bars B and D so that their larger demagnetizing field will make it easier to magnetize them in the opposite direction.

It is known (e.g. "The Structure and Switching of Permalloy Films" in Magnetism, vol. III, Academic Press, 1963) that a film of magnetic material 0.1 to 1$\mu$M thick will have a magnetization (M) of about $10^3$. A difference in demagnetization factors of 0.01 will produce a 10 oe. difference in switching fields. This is compatible and of the same order as the 10 to 30 oe. transverse fields used in present T-bar type permalloy overlay propagating circuits. For example, if a film 0.1$\mu$M thick and bars 5$\mu$M and 15$\mu$M long are used then demagnetization factors of approximately 0.018 to 0.0053 would be achieved. This shows that workable ratios of bar lengths can be used and obtain effective propagation.

In operation and still referring to FIG. 1 let it be assumed that a bubble domain is positioned on the bubble path and whose polarity is such that at time *t*1 the field H1 is applied to magnetizing bars A and C, the bubble will be attracted to bar A. At time *t*2, bar B becomes magnetized as well pulling the bubble towards it but not all the way. At time *t*3 bars A and C are reversed in magnetization. This bar A now repels the bubble so that it now moves between bars B and C both of which are attracting the bubble. At time *t*4, bars B and D reverse in magnetization so that the bubble moves to between bars C and D. At time *t*5 the bubble moves to between D and A and then the process repeats itself.

The transverse magnetic field is theoretically a stepped square wave as shown in the middle portion of FIG. 1. For operation it is necessary that field H1 is sufficient to reverse the magnetization in bars A and C but not B and D while field H2 can reverse the magnetization in all the bars. This type of stepped field is of course difficult to generate in practice and it will be seen that a properly chosen sine wave will effect bubble propagation. This is seen from the bottom portion of FIG. 1.

In any propagation circuit information density is of prime importance. The propagation circuit according to this invention excels in this regards since by its nature both ends of the long bars may be used as seen in FIG. 2. Alternate reversed short bars X and long bars Y can be patterned to provide parallel bubble paths P and achieve a scanning raster arrangement. Bar Z is a special length bar of intermediate length used to cause reversal of the path. It is effectively a short bar but is positioned to cause the bubble to go to its upper end from where it can pass to the upper end of the adjacent bar Y. It will be seen that each end of long bars Y are used reducing the total number of bars required in this arrangement.

What is claimed is:

1. A bubble domain propagation circuit for moving bubbles along a predetermined path and at a predetermined rate in a sheet or film of magnetic material comprising:

a. an overlay of spaced generally parallel bars of magnetic material positioned over the sheet or film of magnetic material, said bars defining the bubble path and made up of a repeatable sequence of: a first short bar, a second longer bar positioned adjacent and parallel to the first, a third short bar parallel to the first and second but in reversed position, and a fourth longer bar also in reversed position, b. means for generating an oscillating transverse magnetic field in the plane of and generally parallel to the bars, said field being of such form that at one point in its oscillating cycle its magnetic strength is capable of magnetizing the said short bars but not the longer bars and at another point in time is capable of magnetizing all the bars.

2. A bubble domain propagation circuit as in claim 1 wherein the oscillating transverse magnetic field has the waveform of a reversing polarity double step function having a first level of magnetizing strength and a second level of magnetizing strength.

3. A bubble domain propagation circuit as in claim 1 wherein the oscillating transverse magnetic field has the form of a sine wave.

* * * * *